(12) United States Patent
de Groot

(10) Patent No.: US 8,182,625 B2
(45) Date of Patent: May 22, 2012

(54) METHOD OF MANUFACTURING A SANDWICH PANEL AND A SANDWICH PANEL AS SUCH

(75) Inventor: Martin Theodoor de Groot, Driebergen (NL)

(73) Assignee: FITS Holdiing B.V., Driebergen (NL)

( * ) Notice: Subject to any disclaimer, the term of this patent is extended or adjusted under 35 U.S.C. 154(b) by 909 days.

(21) Appl. No.: 11/814,886

(22) PCT Filed: Jan. 24, 2006

(86) PCT No.: PCT/NL2006/000034
§ 371 (c)(1),
(2), (4) Date: Aug. 25, 2008

(87) PCT Pub. No.: WO2006/080835
PCT Pub. Date: Aug. 3, 2006

(65) Prior Publication Data
US 2009/0047463 A1    Feb. 19, 2009

(30) Foreign Application Priority Data
Jan. 31, 2005 (WO) ................ PCT/NL2005/000069

(51) Int. Cl.
 *B29C 44/06* (2006.01)
 *B29C 44/10* (2006.01)
 *B32B 5/20* (2006.01)
(52) U.S. Cl. .......................................... 156/79; 156/311
(58) Field of Classification Search .................... 156/79, 156/306.6, 308.6, 311; 264/46.4, 46.5, 344
See application file for complete search history.

(56) References Cited

U.S. PATENT DOCUMENTS

| | | | |
|---|---|---|---|
| 3,818,085 A * | 6/1974 | Marsland et al. | ............ 264/45.5 |
| 4,150,077 A | 4/1979 | Slocumb et al. | |
| 4,379,103 A | 4/1983 | Doerfling et al. | |
| 5,562,791 A * | 10/1996 | De Groot | ........................ 156/79 |
| 5,702,652 A | 12/1997 | Ricciardi et al. | |

FOREIGN PATENT DOCUMENTS

| | | |
|---|---|---|
| EP | 0393874 | 10/1990 |
| EP | 0636463 | 2/1995 |
| WO | WO92/22420 | 12/1992 |

OTHER PUBLICATIONS

Provo Kluit P.W.C., The Development of In-Situ foamed Sandwich Panels, ISBN 90-400701493-2, NUGI 841, pp. 63, 64.

* cited by examiner

*Primary Examiner* — Michael Tolin
(74) *Attorney, Agent, or Firm* — Thomas, Kayden, Horstemeyer & Risley, LLP

(57) ABSTRACT

The invention relates to a method of manufacturing a sandwich panel (10). Such a sandwich panel consists of a foamed core layer (12) and at least one thermoplastic cover layer (14). The sandwich panel is made by in situ foaming. In a first assembling step a core web, comprising at least one sheet of a thermoplastic material (12) containing an amount of a suitable physical blowing agent is positioned between two cover layers (14). The assembly of core web and cover layers is arranged between two press plates. Due to heat and pressure applied in a subsequent foaming step, foaming of the core web and effective bonding thereof to the cover layers is achieved. Subsequently the foamed assembly is allowed to cool down. Remaining physical blowing agent is removed during a subsequent drying step at elevated temperature while the outflow of physical blowing agent via the peripheral edges of the panel (10) is restricted, e.g. by taping (24) or clamping by clamps (16, 20).

21 Claims, 1 Drawing Sheet

METHOD OF MANUFACTURING A SANDWICH PANEL AND A SANDWICH PANEL AS SUCH

CROSS REFERENCE TO RELATED APPLICATION

This application claims priority to and the benefit of PCT/NL2005/00069 filed Jan. 31, 2005.

BACKGROUND

The present invention relates to a method of manufacturing a sandwich panel by in situ foaming.

Such a method is known in the art, for example from EP-A1-0636463. A sandwich panel generally consists of a foamed core layer, that is covered by two cover layers. The cover layer(s) may comprise (fiber-reinforced) thermoplastics, metal and the like, or combinations thereof. These cover layers are also called facings in the respective art. The in situ foaming process consists of several steps. The first step is an assembling step wherein a core web comprising at least one sheet of a thermoplastic material containing an amount of a suitable physical blowing agent is provided. Subsequently this core web is positioned between e.g. two (fiber-reinforced) cover layers, usually of a similar thermoplastic plastic material. Then the assembly of core web and cover layers is arranged between two press plates in a press. In this state, a foaming step is carried out, wherein heat and pressure are supplied to the press to cause foaming of the core web and simultaneously effecting a bond thereof to the cover layers. During this foaming step, when the temperature has become high enough, the press is slowly opened thereby increasing the distance between the two press plates. This allows for the liquid solvent or blowing agent to expand thereby foaming the core web material. This expansion is performed under generally controlled conditions. In this way, the core web is foamed and the bond between the core web and the facing(s) is generated in one production step without the need for a separate or additional adhesive to be used. When a predetermined foamed core layer thickness is obtained, the foamed assembly is allowed to cool during a cooling step. The foamed assembly thus obtained comprises the foamed core layer covered by the two cover layers. In the in situ foaming process it is essential that physical blowing agent is prevented from being diffused through the facing during the foaming phase as well as during a main part of the cooling phase. Even very tiny amounts passed through a facing during these phases may result in local surface irregularities, foam collapse and/or insufficient adhesion.

If a physical blowing agent comprising a solvent, swelling agent or combination thereof has been used, in general the manufacturing method is completed by a drying step wherein the thus obtained sandwich panel is dried at elevated temperature for a time period sufficient to reduce the level of physical blowing agent, for example by heating the sandwich in an oven. Reduction of the level of physical blowing agent is necessary to achieve a reduction of inflammability that is required for most intended applications, such as lightweight construction panels for aircrafts and the like.

In practice, the known method of manufacturing a sandwich panel comprising at least one fiber-reinforced cover layer by in situ foaming has presented excellent results for relatively small sandwich panels, for example in the order of 25×25 cm at most. Even larger panels have been manufactured using a solvent like methylene chloride (MC). However, it has been found that if sandwich panels are manufactured having larger dimensions, for example 50×32 cm, during scale-up using the same in situ foaming method but using a swelling agent (or a mixture of a swelling agent and a solvent or a solvent having a very low solubility for the respective thermoplastic), the quality of the sandwich panels leave something to be desired. In particular, the facings of the final product showed certain surface irregularities in the form of bulges and/or pits. These surface irregularities are present over the whole surface of the cover layer(s), but frequently at the peripheral edge area. It is expected that even larger sandwich panels made by in situ foaming e.g. having standard dimensions used in industry, would exhibit the same surface irregularities, if a swelling agent, a mixture of a swelling agent and a solvent or a solvent having a very low solubility is used.

SUMMARY

It is an object of this invention to alleviate the above-mentioned drawback of the known method. More particularly, it is an object of the present invention to provide a method of manufacturing a sandwich panel by in situ foaming, which allows for obtaining a sandwich panel comprising at least one (fiber-reinforced) thermoplastic cover layer having none or almost none irregularities in the surfaces of the cover layers.

According to the invention as defined in claim 1, the above object can be met by applying a drying step, wherein the sandwich panel is dried at elevated temperature for a time period sufficient to reduce the level of physical blowing agent while the outflow of physical blowing agent via the peripheral edges of the foamed core layer is maintained at maximum equal to the flow of physical blowing agent from the foamed core layer through the at least one cover layer, at least during an initial stage of said time period. Preferably any escape from physical blowing agent via the peripheral edges of the foamed core layer is prevented, at least during an initial stage of said time period.

Surprisingly it has been found that the occurrence of surface irregularities in the final sandwich product can be prevented substantially by applying a drying step as defined above. In such a drying step, transport of physical blowing agent in the plane of the foamed core layer itself (usually horizontal flow) is reduced. Instead thereof, the main transport direction (usually vertical flow) of the physical blowing agent is from the foamed core layer through the facing(s), homogeneously distributed over the surface area thereof. The outflow of physical blowing agent via the peripheral edges of the foamed core layer may at most be equal to the flow through the facing(s). Preferably the outflow via the peripheral edges is prevented completely. By means of the invention the facing material is opened in a homogeneous manner, with the result that at the later stages of the drying step, the still remaining amount of physical blowing agent is allowed to escape via this facing. Without wishing to be bound to any theoretical principle, it is believed that when the facings are not sufficiently opened at the initial stage by the physical blowing agent, the glass transition temperature will be too high in a later stage thereby reducing the diffusion rate of the physical blowing agent, to allow for an effective transfer of physical blowing agent from the foamed core layer to the environment through the facing(s). If a facing is not opened sufficiently, the remaining amount of physical blowing agent is too high with respect to the required drying temperature and allowable internal pressure, thereby causing a localized additional foaming of the core web, or even a rupture of the foam cells. After the facing has been opened during the initial stage of the drying step, it is no longer necessary to prevent escape from the peripheral edge. However, usually this particular escape is prevented during the entire drying step. In the context of this specification the term "initial stage" means directly from the start of the drying process during a certain period of time, usually until the panel has achieved a temperature above 100° C. The length of this time period and the temperature is also dependent from the physical blowing agent, the thickness of the cover layer(s) and the thermoplastic used.

Here it is noted that WO 92/22420 A1 discloses a method for producing a composite material using a thermosetting (curable) resin containing expandable thermoplastic particles. Drying (emission of solvent) is said to take place simultaneously with expansion of the thermoplastic particles with direct continuing successive curing of the resin. U.S. Pat. No. 4,379,103 likewise relates to a method of producing a composite article having a thermosetting resin foam core. Both prior art documents do not relate to an in situ foaming step as is part of the method according to the invention. Such an in situ foaming step requires the distance of the press plates being increased during expansion. This increase is advantageously controlled in a gradually manner.

An advantage of in situ foaming of a core web comprising at least one thermoplastic sheet comprising a physical blowing agent in an amount sufficient for blowing, wherein the core web is positioned between cover layer(s), is that foaming of an anisotropic foam core and adhesion simultaneously occur without the need of an additional adhesive layer between foam and facing. This results in a cheap and simple manufacturing process, and weight saving in the final (lightweight) product.

In the context of this specification the term "physical blowing agent" comprises a solvent for the thermoplastic, a swelling agent or combination thereof. A chemical blowing agent which reacts in the core web during the foaming step in order to produce a gas, may also be present. However, the most significant improvement of the surface quality of the final panel compared to the prior art is achieved, when a swelling agent, mixture of swelling agent and solvent or solvent having a very low solubility for the thermoplastic of the core web and/or facing(s) is used. A physical blowing agent comprising a swelling agent is therefore preferred. It is expected that the method steps according to the invention are also necessary when a mixture comprising a chemical blowing agent and a small amount of solvent is used in the in situ foaming step.

According to one embodiment of the invention the escape from physical blowing agent is prevented by sealing the peripheral edges of the foamed core layer with a fluid/gas impermeable element. A preferred embodiment of such an element comprises a tape, which is impermeable to the physical blowing agent used in the foaming step. More preferably the tape is made from aluminium.

In an other preferred embodiment the peripheral edges of the sandwich panel are clamped, such as between clamps, stamps or presses. In this embodiment the outer edge areas of the sandwich panel are compacted, thereby reducing the distance between the cover layers (by destroying or compacting the foam structure of the core layer). The edges thus formed with a reduced thickness form a barrier which substantially prevents the escape from solvent or blowing agent via these edges. Preferably such an edge deformation step is performed directly after the foaming step and prior to the cooling step, or immediately after the latter. Usually the deformed edge has to be removed from the finished panel in view of its appearance. However, for some applications such as where the edges are received in frames, the panel can be used as it is.

In an alternative preferred method, prior to drying the panel is incorporated into an open frame having a shape according to the outline of the panel, of which frame the inner periphery comprises a rubber sealing strip. This sealing strip effectively presents the escape of physical blowing agent via the edges of the foamed core layer during the subsequent drying step.

In yet another embodiment at least one facing has surface dimensions larger than those of the core web. After the in situ foaming step and cooling step, but prior to the drying step, the sections of the facing(s) projecting beyond the core web are folded over the exposed edge(s) of the foamed core web and then adhered thereto or to each other, e.g. by adhesive bonding or hot sealing. Here the flow resistance of the sealed peripheral edges will be substantially similar to that of the main surface of the facing.

In a totally different approach the escape from physical blowing agent via the peripheral edges is prevented by reducing the glass transition temperature of the cover layer(s) prior to performing the drying step. Preferably this reduction is performed by applying the same physical blowing agent to the outer surfaces of the cover layer(s), e.g. by wetting or spraying. Increasing the concentration of physical blowing agent in the facing(s) reduces the glass transition temperature of the respective facing, thereby opening the respective facing for transfer of physical blowing agent from the foamed core layer through the facing to the environment.

In a similar way physical blowing agent e.g. as a mixture thereof with an inert gas can be added during at least part of the drying cycle to the oven environment in which the drying step is carried out in order to keep the facing(s) open during a relatively longer time thereby increasing the diffusion rate of the physical blowing agent through the facing(s), resulting in a reduced drying timer and/or reduced level of remaining physical blowing agent. The same effects can be achieved by not discharging the physical blowing agent that has been removed from the sandwich panel during drying directly out of the oven, but instead maintaining it in the oven atmosphere for some time.

Combinations of the various embodiments are also contemplated.

In a more preferred embodiment the drying step is performed in an inert atmosphere, for example nitrogen.

In a preferred embodiment the initial stage of said time period comprises raising the temperature from ambient temperature to about 70-90° C. in about 0.5-1.5 hr. According to this embodiment, initially the temperature is raised faster than in the prior art, wherein several hours are used for this temperature increase to be achieved. Such a faster initial stage is made possible by the drying step according to the invention, e.g. wherein the edges are prevented from allowing physical blowing agent to escape. By performing a faster initial stage the total drying cycle time can be reduced substantially from about 48 hours according to the prior art to for example less than 36 hours. This is an important economical advantage, because the total production time is reduced compared to the prior art.

After the initial stage the temperature is raised usually in intervals to a temperature in the range of 150 to almost the Tg of the foam core material, e.g. Tg of PEI is about 220° C. The increase between these time periods is usually about 10 degrees. The sandwich panel is maintained at each intermediate temperature for a sufficient period of time, for example two hours.

In yet a further preferred embodiment of the invention the drying step is initiated within 10-12 hours after the end of the foaming step.

Preferably the drying step is carried out for a sufficient period of time such that the concentration of physical blowing agent, in particular a flammable swelling agent, in the final product is less than 1%, preferably less than 0.5%.

Here it is to be noted that the total drying time depends inter alia from the thickness of the cover layer(s). A smaller thickness gives a shorter drying time and/or reduced level of remaining physical blowing agent.

Examples of swelling agents include acetone, methyl ethyl ketone, methyl acetate, methyl propionate, nitro ethane, cyclohexane, ether, ethanol, methanol and pentane, and mixtures such as ethanol/acetone and methanol/methylacetate. Acetone is a preferred swelling agent. A mixtures of a swelling agent and a solvent is exemplified by methylenechloride and ethanol. Solvents having a very low solubility comprise e.g the above exemplified swelling agents. As the skilled person recognizes, whether a specific agent is called either a swelling agent or a solvent having a low solubility depends on the specific thermoplastic(s) used.

The method according to the invention can be performed using any thermoplastic plastic material, which is in situ foamable by a physical blowing agent as defined hereinabove. Examples of suitable thermoplastics include polyether imid (PEI), polyether sulphone (PES), polysulphone, polyphenylsulphone (PPSU), polyketone, liquid crystal polymers, polycarbonate (PC), propylene etc., and combinations thereof. A preferred material is polyether imid. This is available from General Electric under the tradename Ultem in different grades. Preferably the facing(s) are reinforced, dependent from the intended application and the required physical properties, in particular weight and strength. Glass fibers are a preferred example of reinforcing fibers which are advantageously present in the cover layer(s). However other inorganic fibers, such as metal fibers, carbon fibers and organic fibers like aramid fibers, can also be applied. In addition to the above synthetic fibers natural fibers can also be used. The thermoplastic in situ foamed core material may optionally be reinforced with fibers or with nano-particles. Preferably the thermoplastic material of the core web to be foamed and the thermoplastic cover layer(s) is the same. However, combinations of different thermoplastics are also contemplated. Suitable examples thereof comprise inter alia PEI foam covered with facings made from PPSU, PS or PC, and PES or PPSU foam covered with PSU or PC facings.

The in situ foamed thermoplastic sandwich product may include one or more intermediate layers. The choice of fiber in the core material, the covering layer or layers, the intermediate layer or layers, the reinforcing layer is not subject to any restriction whatsoever. Inorganic fibers, such as glass fibers, metal fibers, carbon fibers, and organic fibers, such as aramid fibers, can be used as desired, as can natural fibers, provided that they are able to withstand the conditions encountered while the method is being carried out.

The fibers in the cover layer or layers, the intermediate layer or layers and the reinforcing layer may optionally be oriented, and there are no restrictions whatsoever on the length and orientation. Knitted fabrics, woven fabrics, mats, cloths and unidirectional fibers represent various manifestations thereof. Preferably the sandwich panel made according to the invention comprises at least one more preferably two fiber-reinforced thermoplastic cover layers for the reasons already mentioned earlier. A combination of one fiber-reinforced thermoplastic cover layer and a non-plastic (fiber-reinforced) facing such as a metal plate or Glare® facing is also contemplated.

A preferred combination is polyether imid as thermoplast, glass as fiber material and acetone as blowing agent.

In the context of this specification "panel" means an object having a thickness that is small compared to its length and width. Advantageously the sandwich panel is a flat two dimensional panel (thickness small compared to length and width). However three dimensional panel products such as single or double bent platelike panels are also contemplated.

The invention also relates to a sandwich panel comprising a foamed thermoplastic core layer and two cover layers comprising at least one thermoplastic cover layer, wherein the total amount of physical blowing agent selected from a swelling agent or very low soluble solvent for the thermoplastic at room temperature, is less than 0.5% by weight. The preferred embodiments of the method according to the invention are similarly applicable to this sandwich panel.

The sandwich panels according to the invention can be further processed, for example shaping to the desired final shape by edge finishing. The sandwich panels made in accordance with the present invention are advantageously used in light weight applications where fireproof properties and/or sufficient strength/stiffness are required. A preferred application area is the transport sector, in particular the air- and spacecraft industry. With respect to flammability the OSU values (a standard in the aircraft industry) are reduced to Total/Peak<8/35 as a result of the improved drying step according to the invention, compared to 10/50 in the prior art.

DRAWINGS

The invention will be further explained by means of the following examples, and drawing. In the drawing.

DESCRIPTION OF GENERAL IN SITU FOAMING PROCESS

Figure 1:
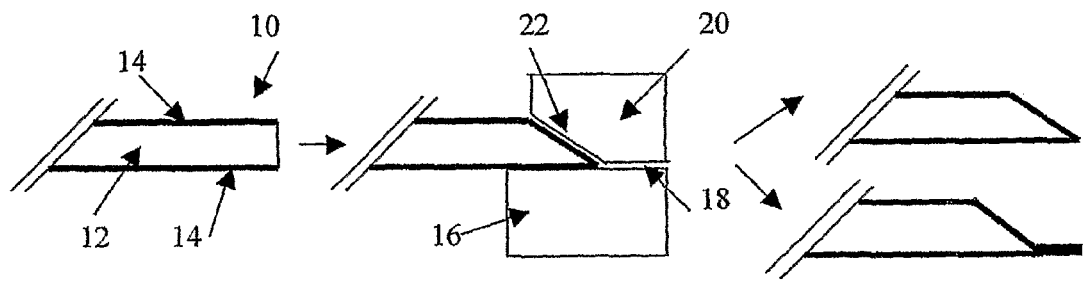
FIG. 1 shows a first embodiment of sealing the edges of a sandwich panel.

A sandwich panel (500×320 mm), consisting of consolidated glass fiber reinforced polyetherimid cover layers, and an in situ produced polyetherimid (PEI) foam was manufactured according to the following method.

Two films of 250 micron of polyetherimid (Ultem 1000 standard grade of General Electric company, impregnated with acetone) are placed between two cover layers with a thickness of ±0.50 mm. The cover layer is a consolidated sheet of 2 layers glass fabric (US Style 7781) prepreg, impregnated with 32±1% polyetherimid. The prepreg is manufactured by a known solvent impregnation method, and is dried before consolidation to a residual solvent content of NMP<0.1% of the resin weight. See also EP-A-636463. This assembly of film and cover layers is placed between two heated press plates, to which a pressure is applied of about 20-50 kg/cm$^2$. After the assembly has reached the foaming temperature, the press is opened gradually, until the required foam thickness is obtained, in this particular case a thickness of 7.1 mm. After a controlled cooling step from the foaming temperature to a temperature of about room temperature, the sandwich panel is removed from the press.

The thus produced panel is a flat sandwich panel with an equally distributed thickness. In some cases, the produced panel showed a decline in thickness at all the edges, resulting from the shape of the press plates and the foaming process itself. See Example B below.

The way of drying significantly influences the drying result, as explained in more detail in the following examples:

COMPARATIVE EXAMPLE A

The edges of the foamed sandwich panel manufactured according to the general in situ foaming process outlined hereinabove were removed by cutting, and subsequently the panel was subjected to a drying step for a period of time from 36-48 hours. The resulting panel showed irregular expansions in the thickness direction in the centre, while the peripheral sections were planar. Further examination of this panel revealed that at some locations the core layer was additionally foamed, but most frequently the foam structure was destroyed or teared apart.

Further experiments wherein the total drying time was extended, did not improve the results. Instead thereof the same phenomena were obtained. In some cases the amount of acetone removed was insufficient, thereby rendering a panel that does not fulfil the criteria with respect to flammability.

COMPARATIVE EXAMPLE B

The edges of the panel after foaming had a smaller thickness compared to the main thickness of the panel. The panel was subjected to a drying step as in Example A.

The result was a panel having a flat centre, showing bulges along the edges at several positions. Further examination revealed that at those positions the foaming process had restarted during drying. Furthermore insufficient acetone had been removed.

EXAMPLE C

Prior to drying, the edges on three sides of the rectangular sandwich panel were sealed by pressing them between a stamp. After drying during 36 hours the panel obtained had a flat appearance at the centre and the three sides which had been sealed, while at the fourth side bulges appeared. The amount of acetone was reduced below the upper limit with respect to flammability and fire resistance.

EXAMPLE D

This example is the same as Example C. However prior to drying, the edges on all four sides were sealed by pressing them using a stamp. The sandwich panel thus obtained had a flat appearance without any irregularities over its entire surface. The residual amount of acetone was less than 0.5%. The foam core layer had an anisotropic structure having a compression strength of at least 2.3 Mpa at a density of 90 kg/m$^3$.

Due to the significant occurrence of the surface irregularities in sandwich panels made according to the prior art, it is beyond any doubt that in manufacturing sandwich panels having even larger dimensions, e.g. standard industry sizes of 4×8 ft, the improved drying step according to the invention has to be applied

COMPARATIVE EXAMPLE E

A sandwich panel (250×250 mm) having a total thickness of 10 mm was manufactured by in situ foaming, as generally described hereinabove using a drying cyclus of about 48 hours including heating from room temperature to 70° C. and then to a maximum temperature of 180° C. and cooling to about 40° C. At 100° C. measurement of the acetone content revealed that only 30-40% by weight of the total amount of acetone initially present, had been removed.

The sandwich obtained had two cover layers of consolidated fiber-reinforced polyether imid (US Style 7781; resin content 33±2%) having a thickness of 0.45 mm. The density of the foam was 90 kg/m$^3$. The total weight per surface area is 2619 g/m$^2$ (cover layers 1800 g/m$^2$+foam 9.1×90 g/m$^2$) The remaining amount of acetone was 0.5-1% (13.1–26.2 g/m$^2$). Mean value OSU is Total 8/Peak 50.

EXAMPLE F

A sandwich panel (500×320 mm) having a total thickness of 10 mm was prepared by in situ foaming using a drying cyclus of 36 hours wherein the edges were tightly compressed and wherein the temperature of the foamed product was raised from room temperature to 70° C. in about 0.5-1 hour, subsequently to 90° C. in another 0.5 hour and then stepwise raised to a maximum temperature of 205-210° C. Due to the rapid initial heating, at 100° C. it appeared that already 50-60% of the acetone had been removed. This allowed for the decrease in total drying time.

The sandwich obtained had two cover layers of consolidated fiber reinforced polyetherimid (US Style 7781; resin content 33±2%) having a thickness of 0.45 mm. The density of the foam was 85 kg/m$^3$. The total weight per surface area is 2573 g/m$^2$ (cover layers 1800 g/m$^2$+foam 9.1×85 g/m$^2$) The remaining amount of acetone was about 0.3%. Mean value OSU is Total 8/Peak 32.

EXAMPLE G

A sandwich panel was manufactured using the standard procedure according to the invention. Total thickness was 10 mm, and the density was 85 kg/m$^3$. The thermoplastic layer to be foamed in-situ was sandwiched between one layer fiber reinforced PEI, each having a thickness of 240 micrometer. It was shown that even in this case the edges had to be sealed during drying (drying time 18-24 hrs.) in order to prevent the occurrence of surface irregularities. The removing content of acetone was less than 0.15%. The mean value OSU was well below 35/35.

These Examples show clearly that if transfer of physical blowing agent from open edges of the panel being dried is prevented thereby forcing the blowing agent to escape via the facings, excellent results with respect to surface appearance and properties are obtained.

The Figures diagrammatically show various embodiments of the essential features of the invention. FIG. 1 shows a peripheral part of a panel 10 consisting of an in situ foamed core layer 12 and cover layers 14 at both main surfaces of the foamed core layer 12. Prior to drying the peripheral part 10 is introduced between a clamp comprising a lower clamp part 16 having a flat upper surface 18 and an upper clamp part 20 having an inclined lower surface 22. Depending on the distance the peripheral part 10 is inserted between the clamp parts 16 and 20, the resulting shape is shown in the right hand side of FIG. 1.

Figure 2:
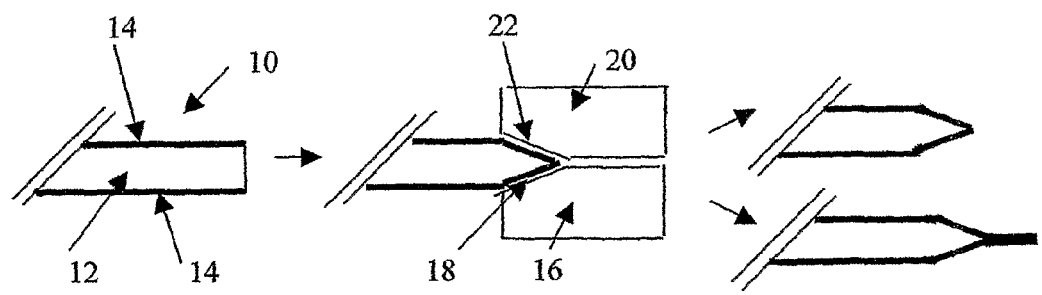
FIG. 2 shows a second embodiment of sealing the edges of a sandwich panel.

FIG. 2 diagrammatically shows the same arrangement as in FIG. 1, however in the clamp used both parts 16 and 20 have an inclined surface opposite to each other. The resulting edge shape is once again shown at the right hand side of this Figure. The clamps could be heated to a maximum of the foaming temperature. In the example of the in situ foamed PEI sandwich with acetone as physical blowing agent about a maximum of 90° C.

Figure 3:
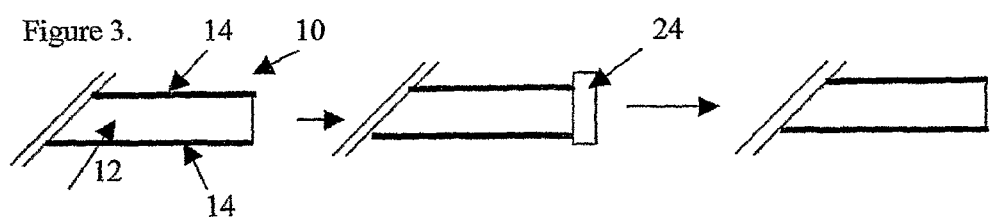
FIG. 3 shows a third embodiment of sealing the edges of a sandwich panel.

FIG. 3 shows diagrammatically an embodiment wherein the peripheral part 10 is sealed by means of an impermeable tape 24. In this embodiment no deformation of the edges is necessary in order to effectively prevent escape of blowing agent or solvent through the edges.

Figure 4:
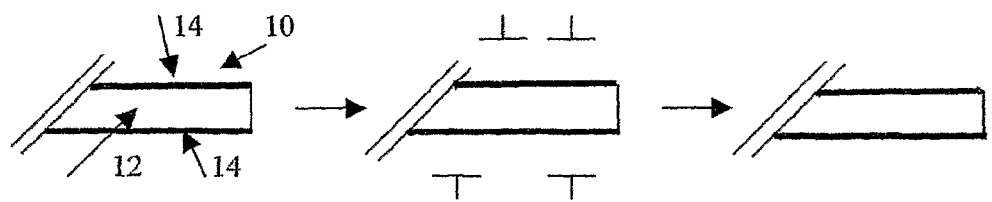
FIG. 4 shows an alternative embodiment of forcing swelling agent to escape predominantly through the cover layers of a sandwich panel.

FIG. 4 diagrammatically shows a further embodiment of the method according to the invention, wherein the cover layers 14 are externally wetted with solvent prior to drying.

The invention claimed is:

1. Method of manufacturing a sandwich panel that comprises a foamed core layer and two cover layers comprising at least one thermoplastic cover layer by in situ foaming, comprising
   an assembling step wherein a core web comprising at least one sheet of a thermoplastic material containing an amount of a physical blowing agent is provided, and wherein said core web is positioned between the two cover layers and wherein the assembly of core web and cover layers is arranged between two press plates;
   a foaming step wherein heat and pressure is supplied to the press plates to cause foaming of the core web and effect bonding thereof to the cover layers, while increasing the distance between the press plates until a predetermined foamed core thickness is obtained;
   a cooling step wherein the press plates are allowed to cool after a predetermined foamed core thickness is obtained; and
   a drying step wherein the thus obtained sandwich panel is dried at elevated temperature for a time period sufficient to reduce the level of physical blowing agent wherein the drying step is carried out while the peripheral edges of the foamed core are clamped such that the outflow of physical blowing agent via the peripheral edges of the foamed core layer is at most equal to the flow of physical blowing agent from the foamed core layer through the at least one cover layer, at least during an initial stage of said time period.

2. Method according to claim 1, wherein the initial stage of said time period comprises raising the temperature from ambient temperature to about 70-90° C. in about 0.5-1.5 hr.

3. Method according to claim 1, wherein said drying step further comprises the steps of raising the temperature to the temperature range of 150° C. to almost Tg of the foam core material in intervals.

4. Method according to claim 1, wherein said drying step is started within 8-12 hours after the foaming step.

5. Method according to claim 1, wherein during the drying step physical blowing agent is removed to a final level in the finished sandwich panel of less than 1% by weight.

6. Method according to claim 1, wherein the drying step is carried out in an inert atmosphere.

7. Method according to claim 1, wherein the thermoplastic material of the core web and the cover layers is the same.

8. Method of manufacturing a sandwich panel that comprises a foamed core layer and two cover layers comprising at least one thermoplastic cover layer by in situ foaming, comprising
   an assembling step wherein a core web comprising at least one sheet of a thermoplastic material containing an amount of a physical blowing agent is provided, and wherein said core web is positioned between the two cover layers and wherein the assembly of core web and cover layers is arranged between two press plates;
   a foaming step wherein heat and pressure is supplied to the press plates to cause foaming of the core web and effect bonding thereof to the cover layers, while increasing the distance between the press plates until a predetermined foamed core thickness is obtained;
   a cooling step wherein the press plates are allowed to cool after a predetermined foamed core thickness is obtained; and
   a drying step wherein the thus obtained sandwich panel is dried at elevated temperature for a time period sufficient to reduce the level of physical blowing agent wherein the glass transition temperature of the cover layers is reduced, prior to the drying step such that the outflow of physical blowing agent via the peripheral edges of the foamed core is at most equal to the flow of physical blowing agent from the foamed core layer through the at least one cover layer, at least during an initial stage of said time period.

9. Method according to claim 8, wherein the initial stage of said time period comprises raising the temperature from ambient temperature to about 70-90° C. in about 0.5-1.5 hr.

10. Method according to claim 8, wherein said drying step further comprises the steps of raising the temperature to the temperature range of 150° C. to almost Tg of the foam core material in intervals.

11. Method according to claim 8, wherein said drying step is started within 8-12 hours after the foaming step.

12. Method according to claim 8, wherein during the drying step physical blowing agent is removed to a final level in the finished sandwich panel of less than 1% by weight.

13. Method according to claim 8, wherein the drying step is carried out in an inert atmosphere.

14. Method according to claim 8, wherein the thermoplastic material of the core web and the cover layers is the same.

15. Method of manufacturing a sandwich panel that comprises a foamed core layer and two cover layers comprising at least one thermoplastic cover layer by in situ foaming, comprising
   an assembling step wherein a core web comprising at least one sheet of a thermoplastic material containing an amount of a physical blowing agent is provided, and wherein said core web is positioned between the two cover layers and wherein the assembly of core web and cover layers is arranged between two press plates;
   a foaming step wherein heat and pressure is supplied to the press plates to cause foaming of the core web and effect bonding thereof to the cover layers, while increasing the distance between the press plates until a predetermined foamed core thickness is obtained;
   a cooling step wherein the press plates are allowed to cool after a predetermined foamed core thickness is obtained; and
   a drying step wherein the thus obtained sandwich panel is dried at elevated temperature for a time period sufficient to reduce the level of physical blowing agent, wherein the glass transition temperature of the cover layers is reduced during the drying step by maintaining an atmosphere around the sandwich panel laden with physical blowing agent, such that the outflow of physical blowing agent via the peripheral edges of the foamed core is at most equal to the flow of physical blowing agent from the foamed core layer through the at least one cover layer, at least during an initial stage of said time period.

16. Method according to claim 15, wherein the initial stage of said time period comprises raising the temperature from ambient temperature to about 70-90° C. in about 0.5-1.5 hr.

17. Method according to claim 15, wherein said drying step further comprises the steps of raising the temperature to the temperature range of 150° C. to almost Tg of the foam core material in intervals.

18. Method according to claim 15, wherein said drying step is started within 8-12 hours after the foaming step.

19. Method according to claim 15, wherein during the drying step physical blowing agent is removed to a final level in the finished sandwich panel of less than 1% by weight.

20. Method according to claim 15, wherein the drying step is carried out in an inert atmosphere.

21. Method according to claim 15, wherein the thermoplastic material of the core web and the cover layers is the same.

* * * * *